US012305783B1

(12) United States Patent
Lucas

(10) Patent No.: US 12,305,783 B1
(45) Date of Patent: May 20, 2025

(54) DEVICE FOR HANGING A SPRAY PAINT GUN AIR HOSE

(71) Applicant: LUMAIII, INC., Wichita, KS (US)

(72) Inventor: Kirk Thomas Lucas, Wichita, KS (US)

(73) Assignee: LUMAIII, INC., Wichita, KS (US)

( * ) Notice: Subject to any disclaimer, the term of this patent is extended or adjusted under 35 U.S.C. 154(b) by 0 days.

(21) Appl. No.: 17/200,812

(22) Filed: Mar. 13, 2021

Related U.S. Application Data

(60) Provisional application No. 62/989,376, filed on Mar. 13, 2020.

(51) Int. Cl.
| | |
|---|---|
| *F16L 3/10* | (2006.01) |
| *B05B 15/62* | (2018.01) |
| *F16M 13/02* | (2006.01) |

(52) U.S. Cl.
CPC ............ *F16L 3/1091* (2013.01); *B05B 15/62* (2018.02); *F16M 13/022* (2013.01)

(58) Field of Classification Search
CPC ...... F16L 3/1091; B05B 15/62; F16M 13/022
See application file for complete search history.

(56) References Cited

U.S. PATENT DOCUMENTS

| | | | | | |
|---|---|---|---|---|---|
| 4,219,178 | A | * | 8/1980 | Assion | A45D 20/12 248/314 |
| 4,696,447 | A | * | 9/1987 | Strecker | F16M 13/022 248/314 |
| 5,695,165 | A | * | 12/1997 | Moriarty | B01L 9/54 248/206.5 |
| 6,464,188 | B1 | * | 10/2002 | Donovan | A61M 5/1415 248/314 |
| 6,491,271 | B1 | * | 12/2002 | Adams | F16B 45/00 248/304 |
| 8,075,235 | B2 | * | 12/2011 | Kosiankowski | F16B 37/0842 411/433 |
| 8,870,132 | B2 | * | 10/2014 | Sampson | F16L 3/22 248/65 |
| 2015/0144753 | A1 | * | 5/2015 | Severson | A44C 15/003 248/305 |

* cited by examiner

*Primary Examiner* — Anita M King
(74) *Attorney, Agent, or Firm* — Robert Blinn

(57) ABSTRACT

An air hose hanging device for hanging a paint gun air hose to a sheet steel wall of a paint room includes a wall mount unit and a hose clamp collar. The wall mount unit includes a generally upright flange and a generally horizontal flange. The upright flange includes magnets suitable for attaching the wall mount unit to the sheet steel wall of a paint room. The horizontal flange presents a channel and an upright slot that are suitable for receiving and holding the hose and hose clamp collar. The air hose is able to be slid through the upright slot into the channel and the hose clamp collar is able to be dropped into the recess in the horizontal flange in order to securely hang the air hose in a position that elevates the air hose above the floor of the paint room.

1 Claim, 9 Drawing Sheets

DEVICE FOR HANGING A SPRAY PAINT GUN AIR HOSE

RELATED APPLICATIONS

This application claim the benefit of U.S. Provisional Patent Application No. 62/989,367 which was filed on 13 Mar. 2020, which is incorporated herein by reference in its entirety.

FIELD OF THE INVENTION

The present invention is a device for supporting a spray paint gun pressurized air hose above the floor of a paint room where spray painting is conducted.

BACKGROUND OF THE INVENTION

The process of spraying paint on a surface such as the surface of a vehicle is a process that requires an almost total mitigation of contaminants such as dirt and dust that are able to reach work surface that is being painted. In many spray paint operations, the painting operation takes place in an enclosed area, or a paint room, which is usually enclosed by walls that present sheet steel surfaces. In such spray painting operations, one objective is to limit the infiltration of airborne dust and dirt that may be deposited upon a work surface that is being painted. In these operations a pressurized air hose supplies pressurized air to a paint spray gun. The floor of a paint room will often have an accumulation of paint dust and the like. Accordingly, because it is often the case that an air hose may be left on the floor of a paint room when not in use, dust and dirt are able to adhere to the air hose. And, when the air hose is used at a later time during a painting operation, it will shed the dust and dirt onto the work surface and thereby may contaminate the work surface that is being painted and thereby ruin the work. What is needed is a device for supporting an air hose above a paint room floor in order to prevent the contamination of an air hose with dust and dirt and the resulting contamination of a surface that is being painted.

SUMMARY

The above stated need is addressed by a hose hanging device for supporting a spray paint air hose above the floor of a paint room so that at least the portion of the sir hose that is likely to be suspended above any work surface during a painting operation is elevated above the paint room floor when not in use. The air hose hanging device includes a wall mount unit and a hose clamp collar. In this example, the hose clamp collar includes first and second portions that are connected by a hinge and are able to pivot with respect to each other between a closed position and an open position. The hose clamp collar, when in the closed position, presents a channel having walls that are adapted for clamping on the outer surface of a paint gun air hose. The wall mount unit includes a generally upright flange and a generally horizontal flange. In this example, the upright flange includes magnets suitable for removably attaching the wall mount unit to the sheet steel wall of a paint room. The horizontal flange presents a channel and an upright slot that is suitable for receiving the air hose into the channel. The horizontal flange also has an upper surface that presents a recess that is suitable for receiving and holding the hose clamp collar if the hose clamp collar is clamped around the air hose. Accordingly, it is possible for an operator to slide the air hose through the upright slot into the channel and then drop the hose clamp collar into the recess in the upper surface of the horizontal flange in order to securely hang the air hose in a position that is sufficiently elevated above the paint room floor to prevent at least the portion of the air hose that is likely to be suspended over any work surface during painting from coming in contact with the paint room floor.

DETAILED DESCRIPTION

Figure 1:
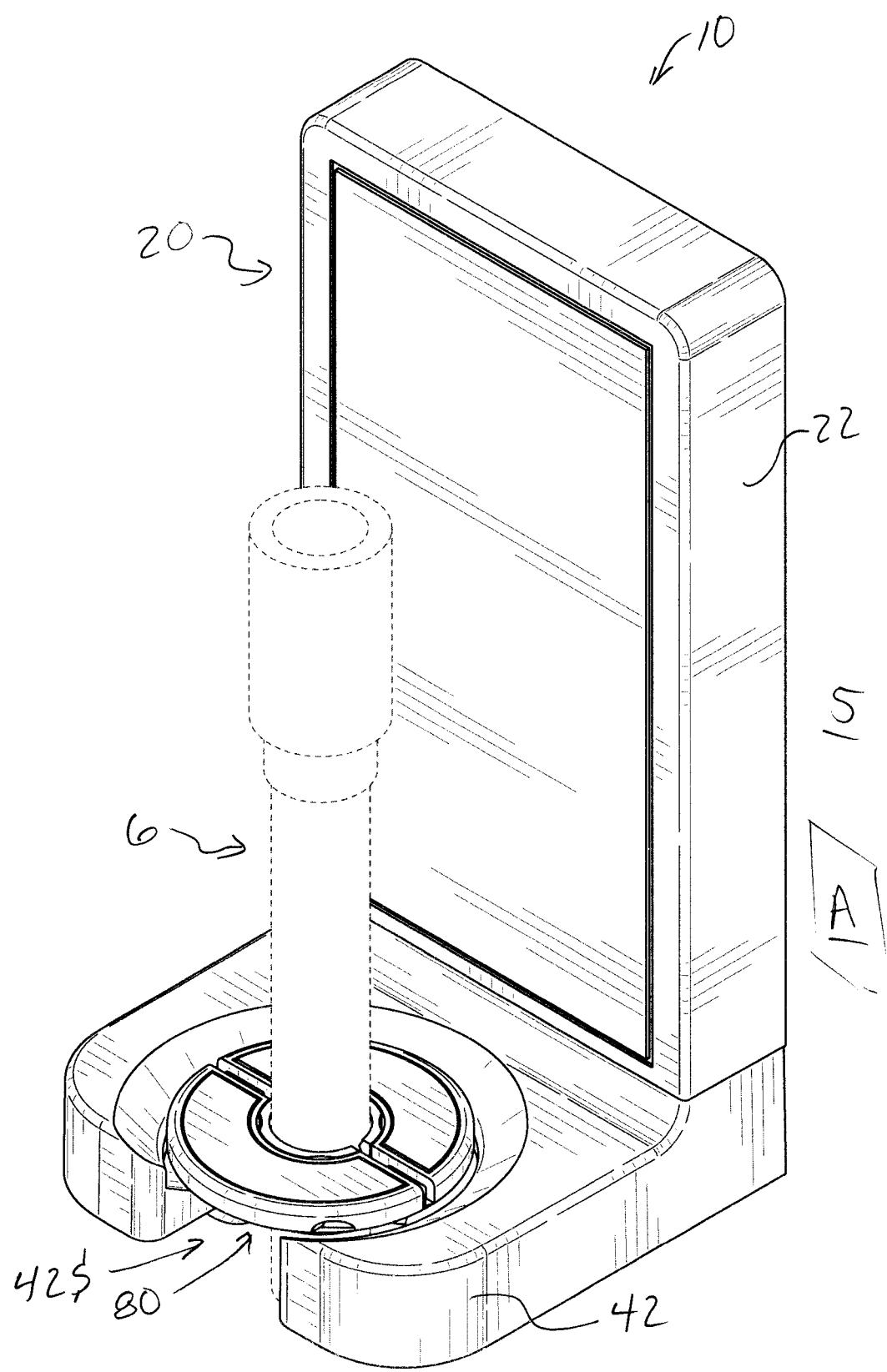
FIG. 1 is a first perspective view of one embodiment of an air hose hanging device shown holding an air hose with a hose clamp collar.
Figure 2:
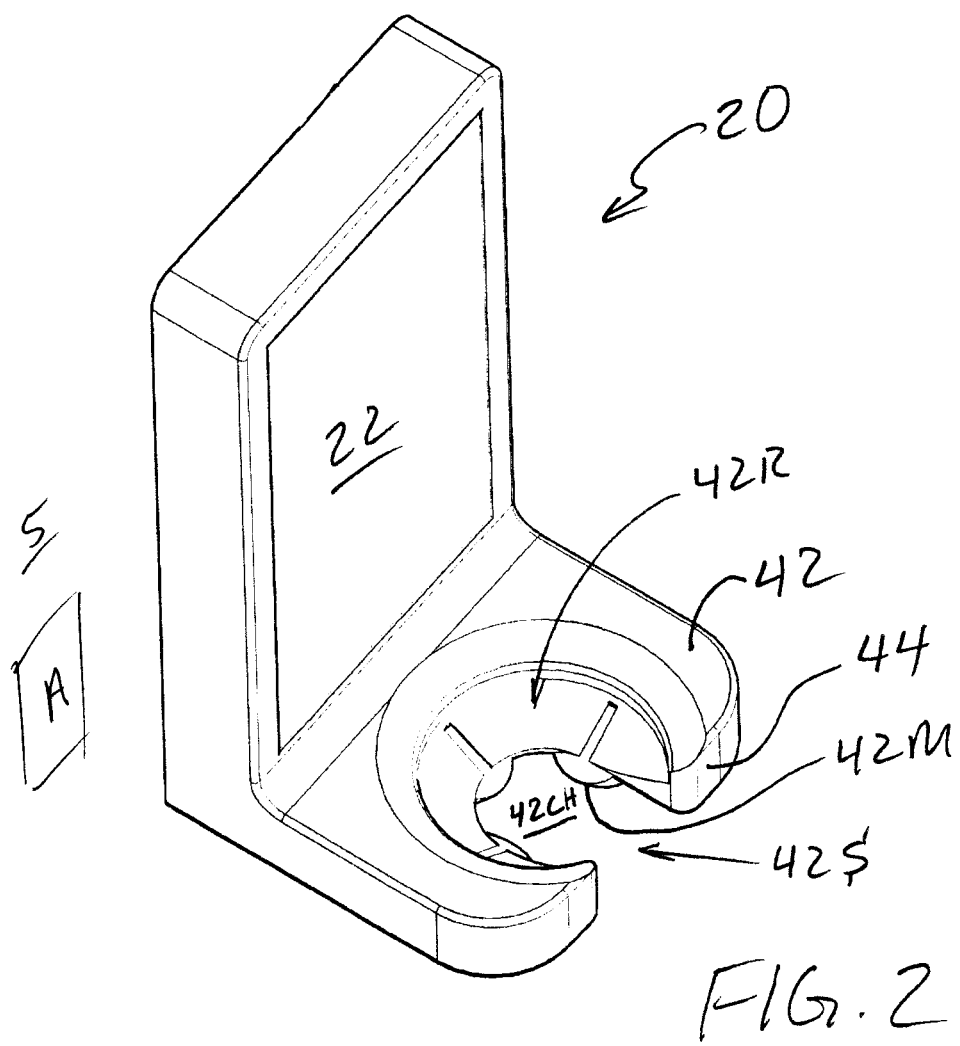
FIG. 2 is a second perspective view of one embodiment of the air hose hanging device shown that is not holding an air hose.

One embodiment of a hose hanging device 10 is shown in FIGS. 1 and 2. In FIGS. 1 and 2, hose hanging device 10 is shown mounted to a paint room wall 5 which in this example is a flat surface in plane A. Paint room wall 5 is preferably fashioned from a magnetically responsive material such as sheet steel. As can be seen in FIGS. 1 and 3-9, hose hanging device 10 includes a wall mount unit 20 and a hose clamp collar 80. As is shown in FIGS. 1 and 3-9, hose clamp collar 80 is clamped around an air hose 6 and hose 6 and clamp collar 80 are received and supported by wall mount unit 20.

Figure 6:
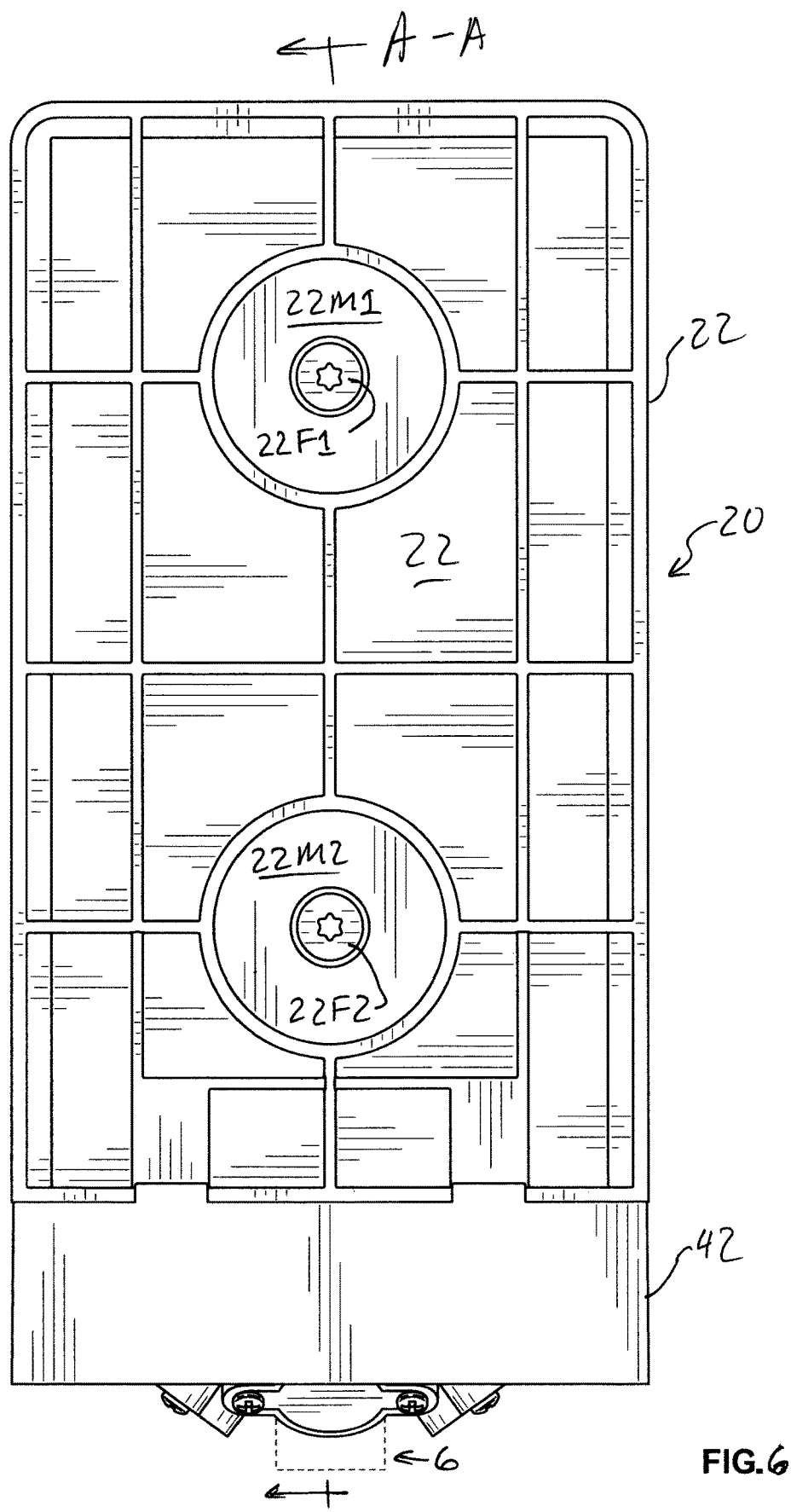
FIG. 6 is a back view of one embodiment of the air hose hanging device shown holding an air hose.
Figure 7:
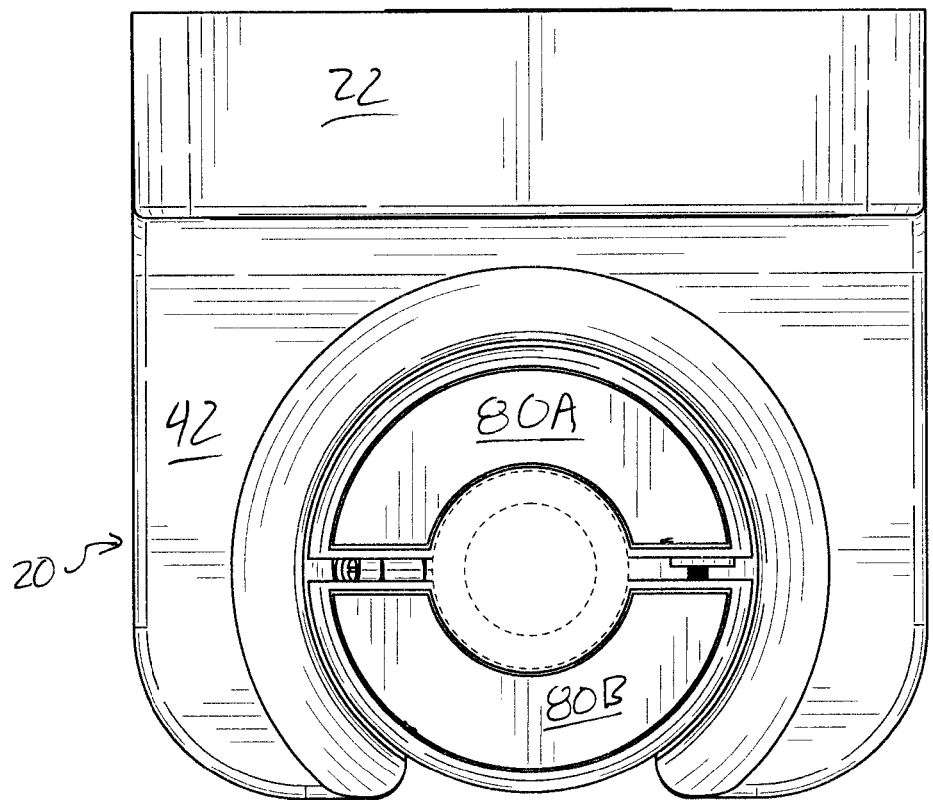
FIG. 7 is a top view of one embodiment of an air hose hanging device shown holding an air hose with a hose clamp collar.
Figure 8:
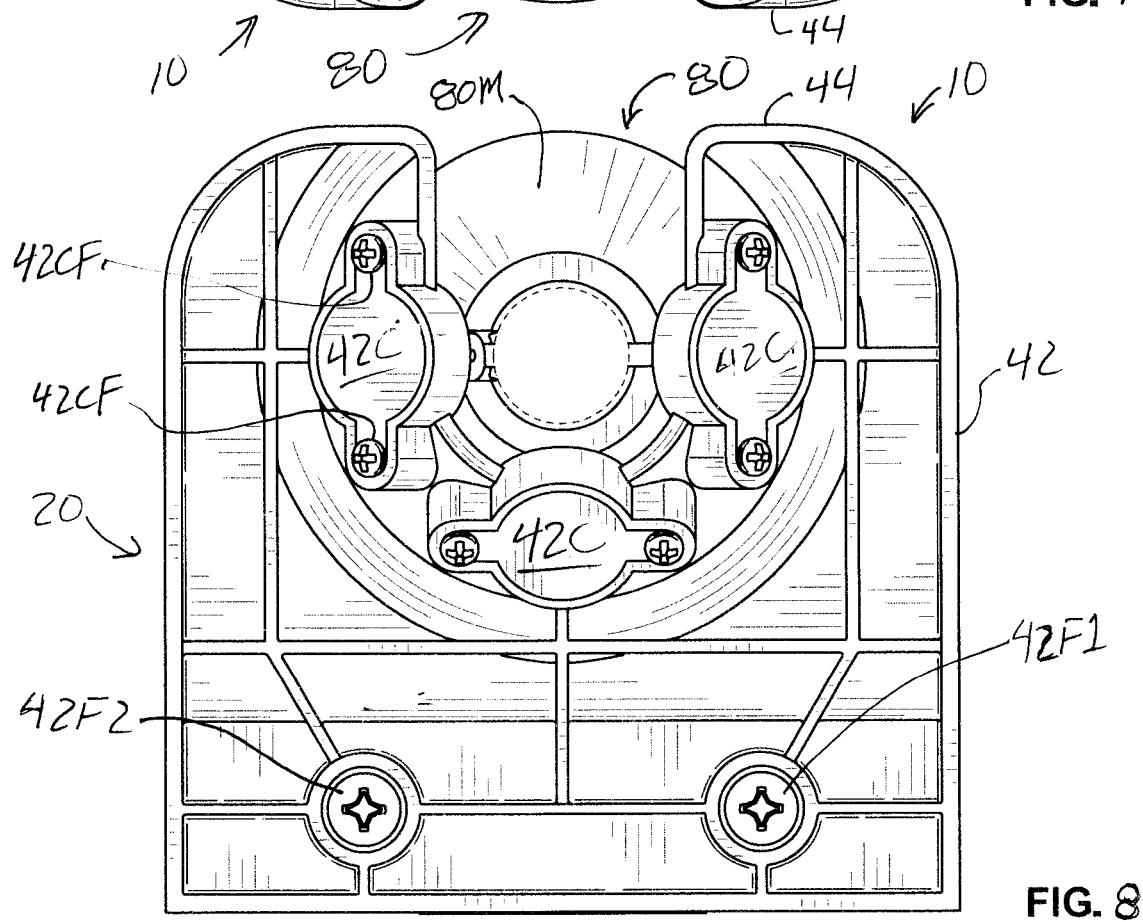
FIG. 8 is a bottom view of one embodiment of an air hose hanging device shown holding an air hose with a hose clamp collar.
Figure 9:
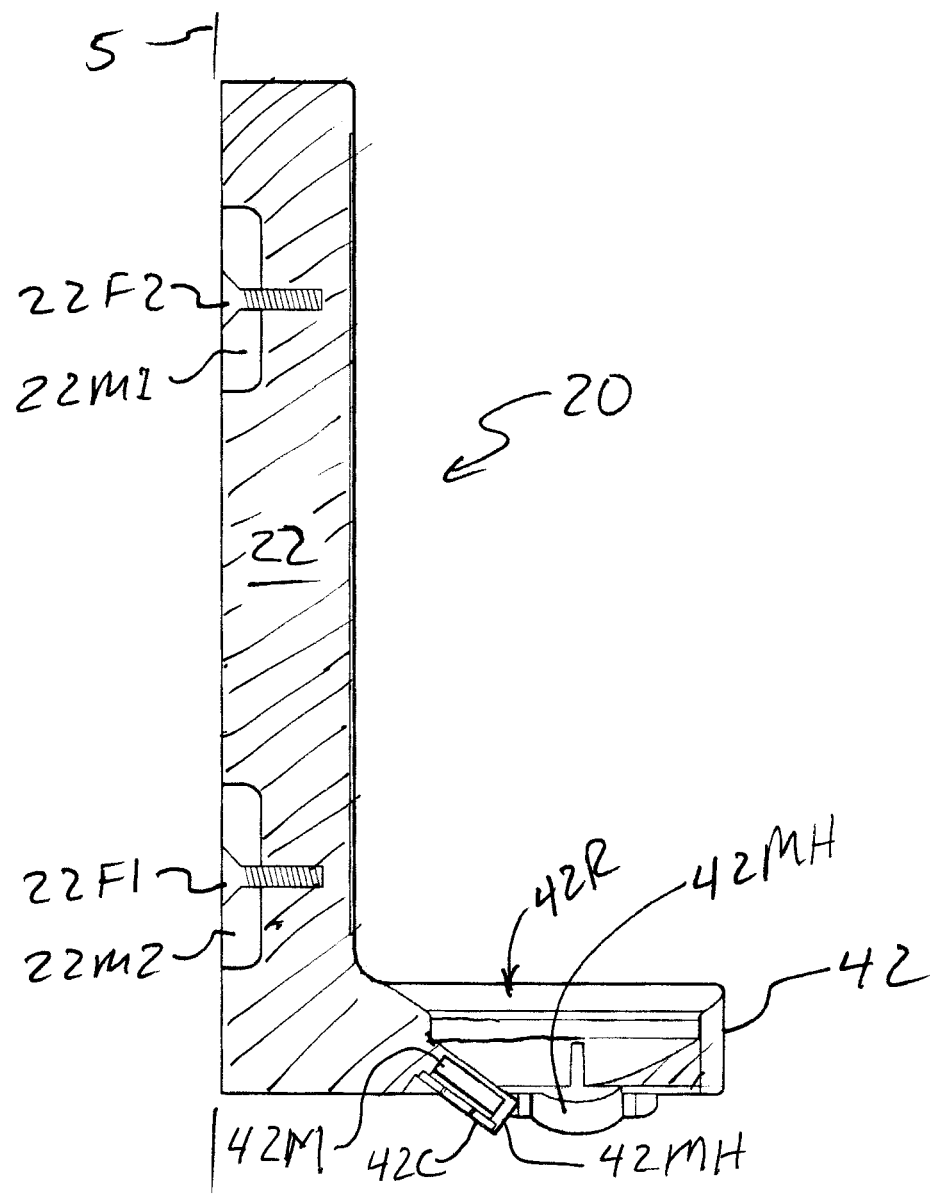
FIG. 9 is a cross section view taken from plane A-A of FIG. 6 showing a cross section view of the wall mount unit of one embodiment of the air hose hanging device.

As can be seen in FIGS. 1-9, wall mount unit 20 includes an upright flange 22 and a horizontal flange 42. Upright flange 22 is arranged for adhering magnetically to paint room wall 5 as shown in FIGS. 1, 2 and 9. FIG. 9 is a cross section view of wall mount unit 20 taken from plane A-A indicated in FIG. 6. As can be seen in FIG. 9, upright flange 22, in this example, has two imbedded magnets 22M1 and 22M2 that are located to be able to be in contact with wall 5. In this example, as shown in FIG. 6, imbedded magnets 22M1 and 22M2 are fixed to upright flange 22 by fasteners 22F1 and 22F2 respectively.

Horizontal flange 42 extends under and away from the lower end of upright flange 22 and terminates in an outboard surface 44. In this example, as shown in FIG. 8, horizontal flange 42 is fastened to the lower end of upright flange 22 by a pair of fasteners, 42F1 and 42F2. In this example, as can be seen in FIGS. 6 and 8, both upright flange 22 and horizontal flange 42 are preferably fashioned from injection molded plastic. As can be seen in FIG. 2, horizontal flange 42 presents a recess 42R that extends through flange 42 to define a channel 42CH (indicated in FIG. 2) that extends from the top surface to the bottom surface of horizontal flange 42. Horizontal flange 42 also presents a slot 42S that communicates between outboard surface 44 and channel 42CH. As can be seen in FIGS. 1 and 3-5, slot 42S is suitable for receiving air hose 6 and recess 42R is suitably shaped for receiving clamp collar 80 as will be described in greater detail below.

As can be best seen by referring to FIGS. 2 and 8, in this example, horizontal flange 42 carries three magnets 42M. Magnets 42M, in this example are generally disc shaped and are arranged around the lower end of flange 42 around channel 42CH (indicated in FIG. 2). The function of magnets 42M will be described in greater detail below. As can be best seen in FIG. 9, each magnet 42M is received by a magnet holder that is incorporated in the lower surface of horizontal flange 42. As can be seen in FIGS. 8 and 9, each magnet 42M is enclosed within a magnet holder 42MH and is retained by a retaining cover 42C that is held in place by two opposite fasteners 42CF (shown in FIG. 8).

Figure 3:
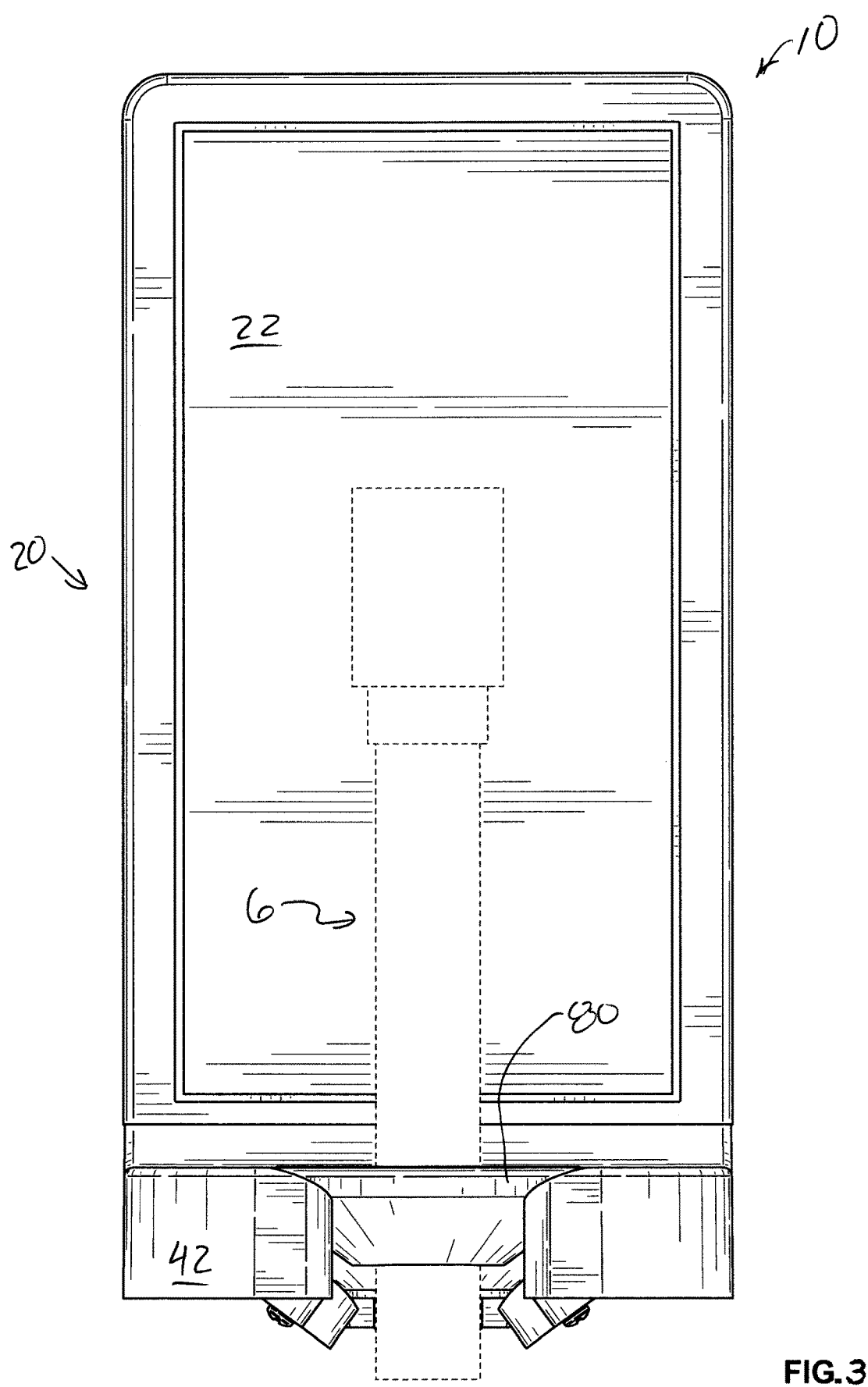
FIG. 3 is a front view of one embodiment of the air hose hanging device shown holding an air hose with a hose clamp collar.
Figure 4:
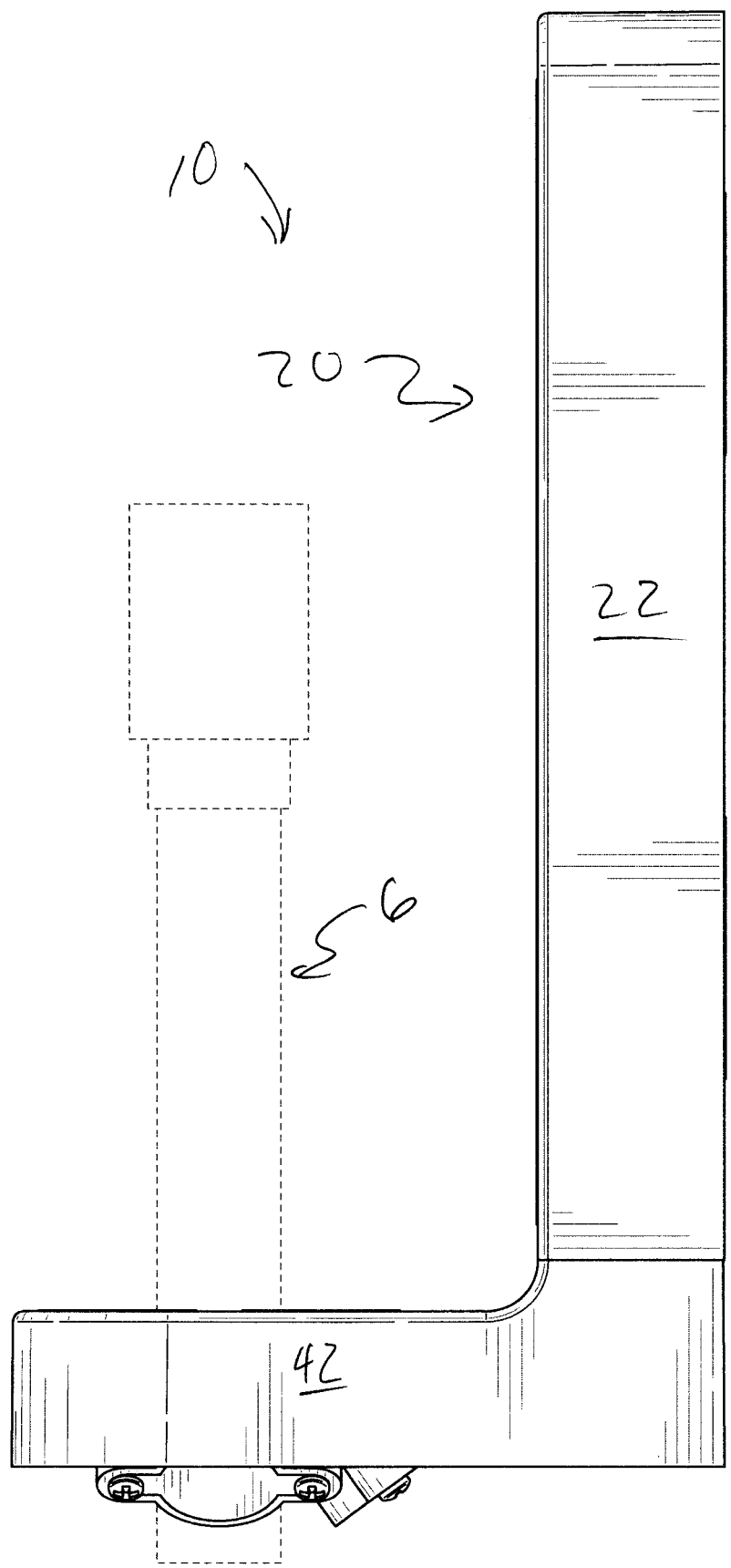
FIG. 4 is a right side view of one embodiment of the air hose hanging device shown holding an air hose.
Figure 5:
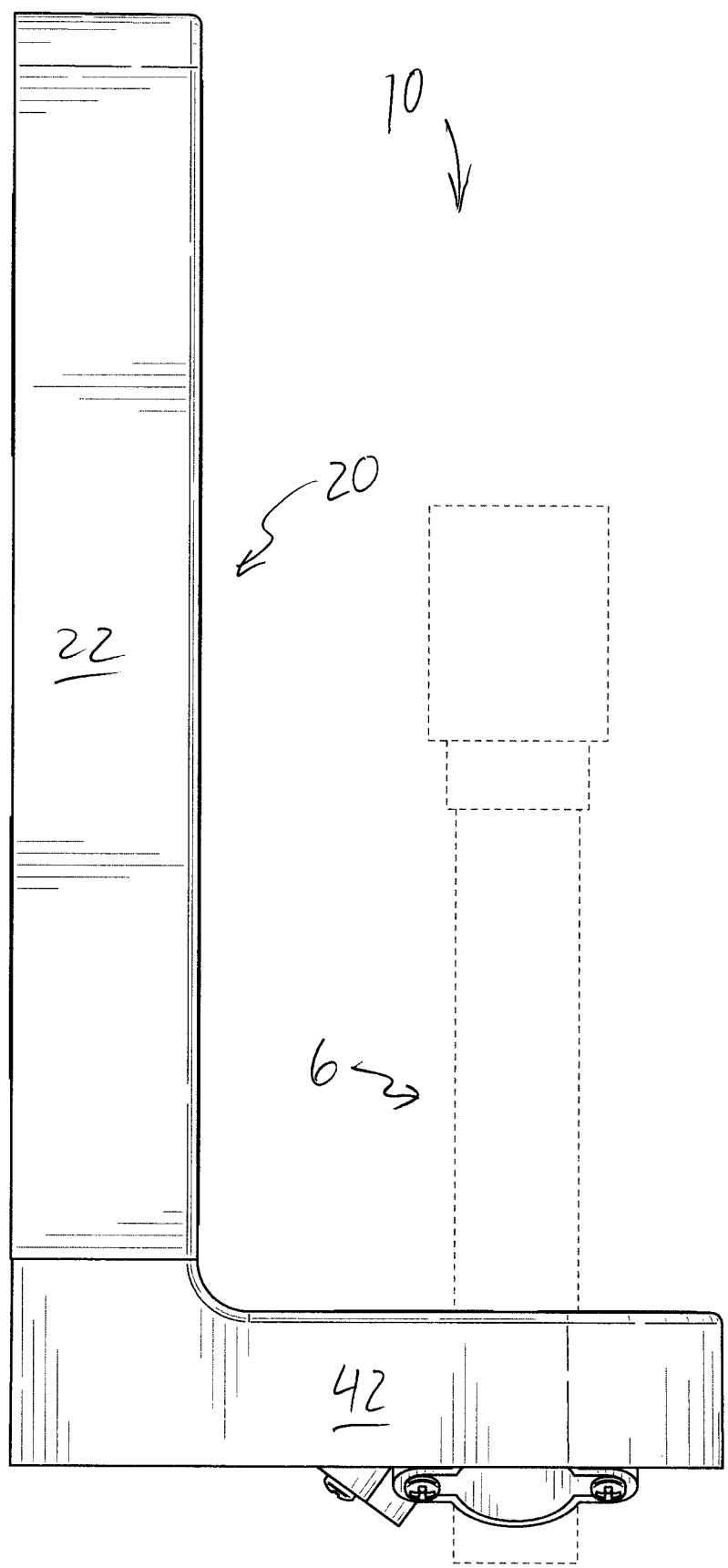
FIG. 5 is a left side view of one embodiment of the air hose hanging device shown holding an air hose.
Figure 10:
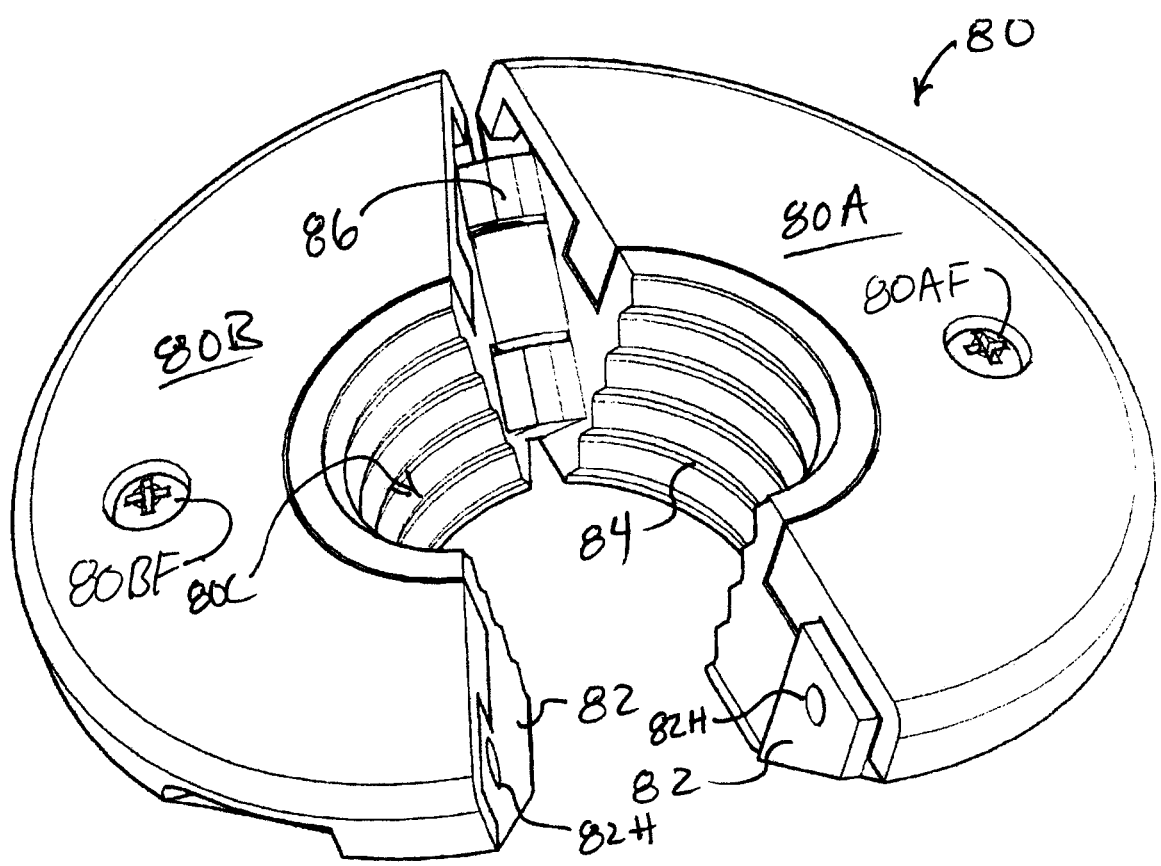
FIG. 10 is an enlarged view of a hose clamp collar showing the hose clamp collar in an open position.

As can be seen in FIGS. 1 and 3, clamp collar 80 is clamped around air hose 6. Clamp collar 80 provides a way to support hose 6 as clamp collar 80 is received by recess 42R. As can be best seen in FIGS. 7 and 10, clamp collar 80 includes two collar portions 80A and 80B that are hinged together by a hinge 86 (shown in FIG. 10). Still further, in this example, each collar portion 80A and 80B may further include an upper portion and a lower portion that are fastened together by fasteners 80AF and 80BF respectively. Preferably, the lower portion of each collar portion is either fashioned from magnetically responsive material or includes magnetically responsive materials. Accordingly, collar portions 80A and 80B are able to pivot with respect to each other between an open position shown in FIG. 10 which is suitable for receiving or removing hose 6 and a closed position as shown in FIGS. 1, 3, 7 and 8 which is suitable for clamping onto hose 6 when collar portions 80A and 80B are fastened together by fasteners 80AF and 80BF. When fastened together, collar portions 80A and 80B present a collar channel 80C that, in this example, has walls that present circumferential ridges 84 that are suitable for gripping the flexible outer surface of hose 6. In this example, inserts 82 which are located opposite hinge 86 provide aligned fastener holes 82H for receiving a fastener for securing collar portions 80A and 80B to each other. Further, because of the presence of magnetically responsive materials 80M (indicated in FIG. 8) within the lower portions of collar portions 80A and 80B, magnetic attraction will occur with magnets 42M (shown in FIGS. 2, 8 and 9) of horizontal flange 42 of wall unit 20 so that clamp collar 80 and hose 6 are secured within recess 42R of wall mount unit 20 and yet can also be removed from wall mount unit 20 with a moderate amount of manual force.

As shown in FIGS. 1 and 3, if clamp collar 80 is clamped onto air hose 6, it is possible to guide air hose 6 through slot 42S of horizontal flange 42 of wall mount 20. Once air hose 6 is in position so that it extends through channel 42CH, hose 6 may be lowered through channel 42CH until clamp collar 80 is removably held in place in recess 42R by magnets 42M. While air hose 6 may be removed from mounting unit 20 with a moderate amount of manual force, air hose 6, once mounted, as shown in FIGS. 1 and 3, will stay in place so that the portion of hose 6 that would likely be suspended over a work surface or even be proximate to a work surface does not pick up dust and dirt from the paint room floor (not shown). This prevents the shedding of such dust and dirt on to a work surface that is being spray painted by a spray gun (not shown) that is supplied with pressurized air by air hose 6.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A hose hanging device for supporting an air hose above the floor of a paint room of the type that includes at least one wall that presents a surface fashioned from a material that has magnetic properties suitable for attracting magnets, the hose hanging device comprising:

(a) a hose clamp collar that is clamped around an air hose, (b) a wall mount unit that includes an upright flange and a horizontal flange, the upright flange including at least one magnet suitable for fixing the wall mount unit to the at least one wall, the horizontal flange, having a top surface, a lower surface and an outboard surface, the horizontal flange presenting a recess that extends through the horizontal flange to define a channel that extends from the top surface to the bottom surface of the horizontal flange, the horizontal flange also presenting slot that communicates between outboard surface and the channel, the slot being suitable for receiving an air hose and the recess also being suitably shaped for receiving the clamp collar, (c) at least one magnet mounted in one of the hose clamp collar or the horizontal flange of the wall mount unit and at least one corresponding magnet or portion of magnetic material mounted in the other of the hose clamp collar or the horizontal flange of the wall mount unit for providing a magnetic attractive force between the hose clamp collar and the horizontal flange of the wall mount unit thereby securing the hose clamp collar to the wall mount unit, whereby an operator is able to slide the air hose into the slot and then drop the hose clamp collar into the recess in order to securely hang the air hose in a position above a paint room floor.

* * * * *